US010012996B1

(12) United States Patent
Canoso et al.

(10) Patent No.: US 10,012,996 B1
(45) Date of Patent: Jul. 3, 2018

(54) ROUTE PLANNING FOR A MOBILE ROBOT USING CONFIGURATION-BASED PREFERENCES

(71) Applicant: Savioke, Inc., San Jose, CA (US)

(72) Inventors: Adrian Canoso, Sunnyvale, CA (US); William H. Vaughan, Redwood City, CA (US); Michael Jae-Yoon Chung, San Jose, CA (US)

(73) Assignee: SAVIOKE, INC., San Jose, CA (US)

( * ) Notice: Subject to any disclaimer, the term of this patent is extended or adjusted under 35 U.S.C. 154(b) by 0 days.

(21) Appl. No.: 15/706,602

(22) Filed: Sep. 15, 2017

(51) Int. Cl.
G05D 1/02 (2006.01)

(52) U.S. Cl.
CPC ......... G05D 1/0274 (2013.01); G05D 1/0221 (2013.01); G05D 1/0231 (2013.01); G05D 2201/0207 (2013.01)

(58) Field of Classification Search
CPC ... G05D 1/0274; G05D 1/0221; G05D 1/0231
See application file for complete search history.

(56) References Cited

U.S. PATENT DOCUMENTS

| 7,584,020 | B2 | 9/2009 | Bruemmer | |
|---|---|---|---|---|
| 8,060,254 | B2 | 11/2011 | Myeong | |
| 8,538,686 | B2* | 9/2013 | Gruen | G01C 21/3617 190/102 |
| 9,382,003 | B2* | 7/2016 | Burema | A01B 79/005 |
| 2004/0167667 | A1 | 8/2004 | Goncalves | |
| 2005/0060069 | A1 | 3/2005 | Breed | |
| 2005/0134440 | A1 | 6/2005 | Breed | |
| 2005/0137786 | A1 | 6/2005 | Breed | |
| 2005/0197175 | A1* | 9/2005 | Anderson | A01B 69/008 460/1 |
| 2007/0005609 | A1 | 1/2007 | Breed | |
| 2007/0021915 | A1 | 1/2007 | Breed | |
| 2010/0217438 | A1* | 8/2010 | Kawaguchi | B25J 9/1661 700/248 |
| 2010/0223031 | A1 | 9/2010 | Vincent | |
| 2014/0005933 | A1 | 1/2014 | Fong | |
| 2015/0242806 | A1* | 8/2015 | Cousins | G06Q 10/087 700/237 |
| 2016/0271795 | A1 | 9/2016 | Vicenti | |

OTHER PUBLICATIONS

Skydrop, Sprinklers and Home Automation (Technology), https://www.skydrop.com, last viewed on Sep. 7, 2017, 4 pages.
GeertJan M., "Clarification dialogues in humanaugmented mapping", Human Robot Interaction '06 Salt Lake City, Utah USA, dated 2006, 8 pages.
Fetch Robotics, "Is cloud-based fleet management software that allows you to quickly set up and deploy your robots", http://fetchrobotics.com/fetchcore/, last viewed on Sep. 13, 2017, 3 pages.
Axel Rottmann, "Semantic Place Classification of Indoor Environments with Mobile Robots using Boosting", 2005, American Association for Artificial Intelligence (www.aaai.org), 6 pages.
U.S. Appl. No. 15/598,130, filed May 17, 2017, Notice of Allowance, dated Aug. 11, 2017.
U.S. Appl. No. 15/584,012, filed May 1, 2017, Office Action, dated Sep. 26, 2017.

* cited by examiner

*Primary Examiner* — Calvin Cheung
(74) *Attorney, Agent, or Firm* — Hickman Palermo Becker Bingham LLP

(57) ABSTRACT

Disclosed are robot configuration-based mapping and planning technologies for a mobile robot.

27 Claims, 7 Drawing Sheets

ROUTE PLANNING FOR A MOBILE ROBOT USING CONFIGURATION-BASED PREFERENCES

FIELD OF THE DISCLOSURE

The present disclosure relates to mobile digital computer controlled robots that can autonomously or semi-autonomously navigate a physical environment, such as a building, to transport items from one location to another, and more particularly to mapping and planning technologies for a mobile robot.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Some robots, such as those designed and manufactured by Savioke, Inc. of San Jose, Calif., are mobile. Mobile robots can be programmed to perform transport tasks within a geographic and/or spatial area having a perimeter that is defined by a boundary. Examples of defined areas include buildings, rooms and floors of buildings, and groups of buildings, such as hotels, office complexes, and hospital campuses. Mobile robots can be programmed to perform transport tasks autonomously or semi-autonomously.

DETAILED DESCRIPTION

Figure 1:
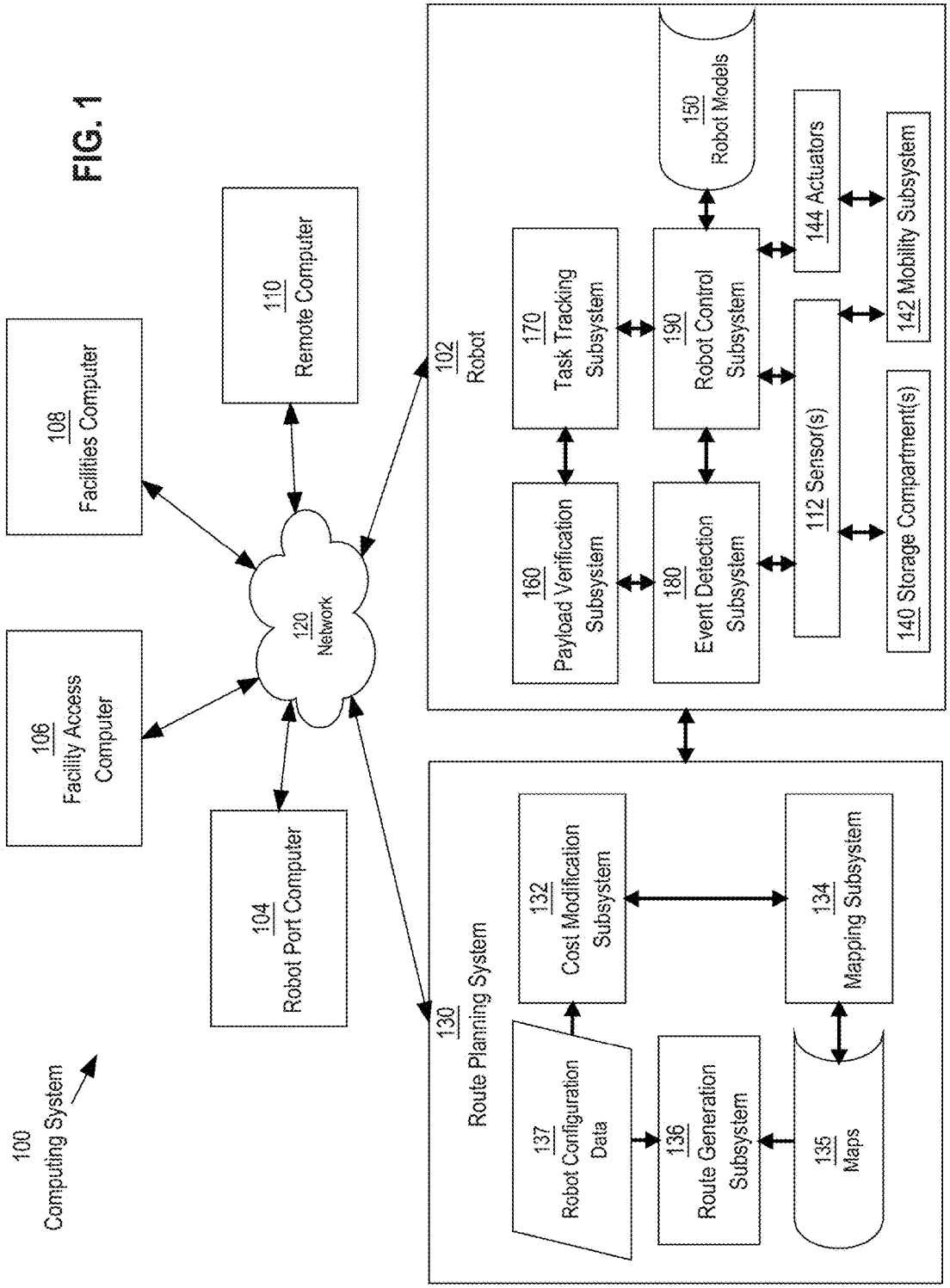
FIG. 1 is a block diagram of an example of a networked environment in which a mobile robot may operate, according to at least one embodiment.

In the following description, for the purposes of explanation, numerous specific details are set forth in order to provide a thorough understanding of the present invention. It will be apparent, however, that the present invention may be practiced without these specific details. In some instances, structures and devices are shown in block diagram form in order to avoid unnecessarily obscuring the present invention.

General Overview

To execute a task, a mobile robot may utilize automated navigation and mapping technologies. Sensors on the robot or located in a physical environment are used to collect data about the physical environment. Mapping technologies use the collected sensor data to create and update maps of a defined area of the physical environment. The mapping technologies are implemented in the robot and/or computers that can communicate electronically with the robot. Maps generated by the mapping technologies include digital data that describe a geographic and/or spatial layout of the defined area.

Task planning technologies can use the maps and other digital information to generate routes for the robot to travel through the defined area, from an origin location to a destination location, in order to execute a task. Task planning technologies are implemented in the robot and/or computers that can communicate electronically with the robot.

To perform navigation, the robot is equipped with one or more sensors that, during operation of the robot, collect data about the physical environment surrounding the robot. Localization and navigation technologies (such as SLAM—simultaneous localization and mapping) use the digital maps and the sensor data to computationally determine the robot's two or three-dimensional spatial position and orientation with respect to the mapped area, at time intervals, during operation of the robot. The localization and navigation technologies may include, for example, computer-implemented visual odometry algorithms.

Using the data indicating the robot's current spatial position and orientation with respect to the digital map, the navigation technologies interface with the robot's control system to initiate electromechanical processes, such as sending power to the robot's motor, locomotion system, or actuators, which cause the robot to travel along the defined route in accordance with certain constraints that may be defined for a particular transport task.

When the robot is to operate in an unstructured environment that has not been purposefully designed to accommodate robots (and thus the geometry and placement of obstacles at any given time may be unknown), motion planning technologies can be used to provide online planning capabilities to allow the robot to avoid obstacles and other features of the physical environment that it encounters during operation.

Existing planning technologies for mobile robots are focused on adapting the robot's trajectory in real time to avoid collisions while the robot is en route to a destination location. Location as used herein may refer to the robot's two-dimensional location and/or three-dimensional spatial position relative to the robot's surrounding physical environment (which may be an unstructured environment) as represented on a map of the physical environment.

As described in more detail below, the technologies described herein can improve upon existing planning technologies for mobile robots by enabling route planning to adapt to specific aspects of the robot's configuration, which may include, for example, specific details of a task description, such as the destination location, the task type, the time of day at which the task is to be executed, payload details, and/or robot behavior specifications that may be particular to a task.

The disclosed technologies can enable a single robot to perform a variety of different tasks at different times using different routes, and/or enable individual robots in a fleet of robots to perform different tasks using different routes, concurrently or at different times. The increased mobile robot route planning flexibility afforded by the disclosed technologies can allow the robot's operations to be customized at a high degree of granularity. For example, using the disclosed technologies, a robot can be programmatically controlled to utilize a discreet route through low-traffic areas of a hotel when the robot's task is to deliver fresh linens and to use a different route that showcases the hotel's amenities when the robot's task is to escort guests to their rooms.

The disclosed technologies can be implemented to improve robotic tasks in many applications, including but not limited to applications in the hospitality and health care industries. A physical item or set of items being carried by a robot may be referred to herein as a payload of the robot. An activity that a robot can be programmed to execute may be referred to herein as a task. A task may involve transport by the robot of payload from one location to another location within a mapped area. Other types of tasks include ushering tasks, in which the robot is programmed to lead or accompany a human person to a destination location within a mapped area, and mingling tasks, in which the robot is programmed remain stationary at a location in a mapped area for a static or dynamically-determined time interval. A robot-navigable path from one location to another location within a mapped area may be referred to herein as a path or a route. The term route may be used to refer to a path or a continuous sequence of paths.

Networked Computing Environment

FIG. 1 illustrates an example networked computing environment in which a robot may operate, according to various embodiments. In FIG. 1, certain computing infrastructure is arranged to support operation of a robot 102. The illustrative computing system 100 comprises the robot 102, a robot port computer 104, a facility access computer 106, a facilities computer 108, a remote computer 110, an electronic communications network 120, and a route planning system 130.

The example robot 102 is equipped with one or more sensors 112, one or more storage compartments 140, robot models 150, a payload verification subsystem 160, a task tracking subsystem 170, an event detection subsystem 180 and a robot control subsystem 190. Details of robot 102 are described further below.

The example route planning system 130 includes a cost modification subsystem 132, a mapping subsystem 134, a route generation subsystem 136, maps 135 and robot configuration data 137. Details of route planning system 130 are described further below.

This disclosure describes structure of and functionality performed by components of the computing system 100, including robot 102, robot port computer 104, facility access computer 106, facilities computer 108, remote computer 110, electronic communications network 120, route planning subsystem 130, sensor(s) 112, storage compartment(s) 140, robot models 150, payload verification subsystem 160, task tracking subsystem 170, event detection subsystem 180 and robot control subsystem 190. Portions of the disclosed functionality are implemented in electronics, electromechanical and mechanical assemblies, and as processor-executable instructions implemented in computer hardware, computer software, or a combination of hardware and software. Such structures and functionality may be represented in the drawings using graphical elements such as boxes and lines.

Capabilities described in this document as being performed by one or more of the computers 104, 106, 108, 110, network 120, route planning system 130 or robot 102 can be implemented entirely in the robot 102 and/or in other computer(s), in some embodiments. Similarly, capabilities described in this document as being performed by the robot 102 may be at least partially implemented using other components of the computing system 100, in other embodiments.

In an embodiment, the computers 104, 106, 108, 110, route planning system 130 and robot 102 are bidirectionally communicatively coupled to the network 120. Network 120 broadly represents any combination of one or more local area networks, wide area networks and internetworks using any of wired, wireless, terrestrial or satellite links. The computers 104, 106, 108, 110 and route planning system 130 may be local to a building or campus in which the robot 102 is deployed. In some embodiments, remote computers or virtual computing instances in networked datacenters may be included in the computing system 100, and portions of the described data and/or functionality may be stored in or executed by an Internet-accessible network of server computers such as a public or private cloud.

When computers within the computing system 100 are local, they may be physically present in the building in which the robot 102 is to operate. In some embodiments, one or more components of the computing system 100 may communicate over the network 120 with other computing systems, such as an enterprise asset tracking system or a workflow monitoring system.

In the example of FIG. 1, computing system 100 includes a robot port having a robot port computer 104. The robot port comprises a device in which, or next to which, robot 102 returns when the robot is not in use. In an embodiment, the robot port may include electronic connections to which the robot 102 can automatically connect for network communication or power, such as to charge a battery of robot 102. For example, robot 102 and robot port may be structured to enable the robot 102 to automatically contact the power connections when the port is reached or mechanically engaged.

The example facilities access computer 106 provides robot 102 with access to data pertaining to features of the mapped area in which the robot is to operate. The facilities access computer 106 may provide an application programming interface (API), which the robot 102 is programmed to call with instructions and data configured to instruct the facilities access computer 106 to operate elevators, request operation of electronic doors, or control security sensors. Facilities access computer 106 may communicate with other electronic systems within mapped area such as elevators, door locks, door opening systems, security sensors, and the like.

The example facilities computer 108 is programmed with supervisory functions for robots 102, and provides an interface for an operator to communicate with the robot. The facilities computer 108 may be programmed to respond to electronic requests made by robot 102 during the robot's execution of autonomous mapping procedures. The facilities computer 108 may control deployment of robot 102 on pick-ups, deliveries, or other transport tasks.

The facilities computer 108 may provide robot 102 with access to data indicative of the location of temporary obstacles in the mapped environment. Examples of such data include locations of holiday decorations, large crowds, and temporary installations.

Facilities computer 108 may be programmed to receive and provide robot 102 with access to data from sensors positioned in or around the mapped area including, for example, moisture sensors, smoke detectors, security cameras, and the like. Additionally, facilities computer 108 may provide robot 102 with access to data describing the time and location of scheduled events affecting the mapped area, such as carpet cleanings, irrigation schedules, and ongoing construction. Any data mentioned in this disclosure may be maintained in a persistent memory or database and may be associated with an anticipated expiration date and/or time. Any such data may be communicated electronically to robot 102 by any suitable method of electronic communication, including wireless communications.

Additional details of robot 102 and exemplary mapping approaches are described below. Additional details of route planning system 130 are described following the more detailed discussion of robot 102 and mapping technologies.

Robot

In the example of FIG. 1, robot 102 is an autonomous, mobile, self-powered electromechanical robot under control of a programmed digital computer, which may be entirely or partially contained in the robot. Some data or functionality of robot 102 may be achieved by the robot communicating with another computer over the network 120. The robot 102 moves, relative to its surrounding environment, using one or more actuator(s) 144 and a propulsion or mobility subsystem 142. Actuators 144 may be implemented using for example mechanical linkages, electric linear actuators, hydraulic actuators, gear sets. Mobility subsystem 142 may be implemented as a set of motorized wheels (or tracks or legs, for example) mounted on a bottom surface of the robot and which may be communicatively coupled to the robot's control subsystem 190 by actuators 144.

The illustrative robot 102 is designed to engage with the physical floor of a facility, but other versions of robot 102 (such as aerial vehicle implementations, like drones) may utilize portions of the disclosed technologies equally as well. The robot 102 may propel itself at velocities that are appropriate to its environment, for example at a human walking speed or slower. In some embodiments, robot 102 may adjust its speed based on conditions of the physical environment in which it is operating. The wheels or other propulsion mechanism implemented in robot 102 may be selected for performance in a variety of indoor and outdoor environments, including adaptability for different surfaces such as tile, carpet, and concrete.

The example robot 102 includes one or more input devices, which may include a touchscreen that provides a graphical user interface (GUI) to communicate messages to humans. Robot 102 may be programmed to generate instructions or execute actions in response to input received via the touchscreen. For example, input received via the touchscreen may include authenticating information of a person who is authorized to receive a delivery of a transported item, such as a passcode or a digital picture of the person. Robot 102 may include other input mechanisms such as a keypad or keyboard, buttons, switches, audio sensors for voice commands, microphones, video cameras, or other readers or sensing devices.

The example robot 102 is equipped with sensor(s) 112, which the robot 102 may use to obtain sensor data indicative of characteristics, activity, or status of, on or in the robot and/or its surrounding physical environment. Exemplary types of sensors that may be implemented on or in the robot 102 include laser sensors, Light Detection and Ranging (LIDAR) position or motion sensors, force sensors, pressure sensors, three-dimensional (3D) cameras, color cameras, barometers, altimeters, accelerometers, and others.

In an embodiment, the laser sensors, LIDAR, 3D cameras, and color cameras collect data that can be transformed under program control to form a model of a physical environment. The model may include data indicative of obstructions or objects that are present within the environment, including physical features like rooms, hallways, doors, and windows, staircases, elevators, doorways, signs, and fiducials. Aspects of the model may be incorporated into a digital map that is used by robot 102 for navigation and task execution. An example map is described in more detail below.

Robot 102 may analyze sensor data obtained from any of its sensors 112 and based on the sensor data execute programming logic to make determinations or decisions, such as navigation decisions, event detection determinations, and control decisions. For example, robot 102 may use sensor data to detect a route-related event, such as a large crowd of people gathered near an elevator or an overturned cart in a hallway.

The example robot 102 is equipped with one or more network interfaces configured to communicate with the computers and systems of the computing system 100. In some embodiments, robot 102 is equipped with shorter-range wireless electronic communication capabilities, which robot 102 uses to communicate with mobile electronic devices, including smartphones, tablet computers, wearable devices, or Internet of Things (IoT) devices. For example, robot 102 may receive an electronic communication from a mobile device associated with a person who is authorized to communicate electronically with robot 102, and in response to the electronic communication, robot 102 to execute a motion planning algorithm to update its plan of travel.

The network interfaces implemented in robot 102 may utilize any suitable wired, wireless, or optical networking technology, including Ethernet, Wireless Fidelity (WIFI), 3G and/or 4G modems, Bluetooth, infrared (IR), radio frequency (RF), near-field communication (NFC), and low-bandwidth radio. In some embodiments, robot 102 is equipped with a Global Positioning System (GPS) receiver, which it uses to determine its geographic location.

Referring still to FIG. 1, the example robot 102 comprises storage compartment(s) 140, robot models 150, payload verification subsystem 160, task tracking subsystem 170, event detection subsystem 180, robot control subsystem 190. The robot models 150, payload verification subsystem 160, task tracking subsystem 170, event detection subsystem 180, and robot control subsystem 190 comprise processor-executable instructions that are implemented in computer software, hardware, or a combination of hardware and software and stored in memory or data storage of the computing system 100.

In general, the robot control subsystem 190 coordinates and controls execution of and communications between route planning system 130, payload verification subsystem 160, task tracking subsystem 170, event detection subsystem 180, using robot models 150, and communicates electronically with other electronic and/or electromechanical components of robot 102 and/or computing system 100 to control the operation of robot 102 as needed. The illustrated components of storage compartment 140, models 150, payload verification subsystem 160, task tracking subsystem 170, and event detection subsystem 180 are described in more detail below.

The example robot 102 is equipped with one or more storage compartments 140. The storage compartment(s) 140 may include sub-compartments, and each compartment or sub-compartment may be sized to hold items that are appropriate to the particular environment or the particular application for which robot 102 is being used. For example, in hospitality applications, storage compartment 140 may permit carrying any of: linens; toiletries; medications; magazines and reading materials; lost and found items such as wallets, keys, and personal electronic devices. In hospital or health care facility applications, storage compartment 140 may be designed to carry, for instance, medications, biological samples, first aid items, medical devices, supplies, and/or food. The foregoing are illustrative, non-limiting examples of applications and types of payload that may be handled by robot 102.

The example robot models 150 include computer-implemented mathematical representations of the kinematics and dynamics of the mechanical components of robot 102. Robot models 150 are used by robot control subsystem 190 to determine planning and motion control parameters for the robot's mobility subsystem 142 and/or other movable components of robot 102. Models 150 may be implemented using suitable computer programming constructs, such as a databases and algorithms implemented in computer code.

The example payload verification subsystem 160 comprises one or more electronic circuits that receive signals from sensors or a microcontroller or microprocessor to interface with event detection subsystem 180 and/or task tracking subsystem 170. For instance, when storage compartment 140 is equipped with a sensing device, such as a scale, a pressure switch, a force sensor, a camera, a bar code reader, or another mechanism capable of detecting placement of items in or removal of items from storage compartment 140, payload verification subsystem 160 analyzes data generated by the sensing device of storage compartment 140 to detect presence in or absence from storage compartment 140 of an item of the robot's payload.

When storage compartment 140 is equipped with a sensing device that can read identifying information, such as a bar code reader or a camera, payload verification subsystem 160 may perform identity verification on a detected item of payload. Payload verification subsystem 160 may communicate data to event detection subsystem 180, for example data indicating that a payload item has been positively or negatively detected and/or identified.

Information obtained by payload verification subsystem 160 may be used by robot 102 or computing system 100 to perform payload-specific route planning. For instance, based on signal(s) generated by sensor(s) 112 and communicated by event detection subsystem 180, payload verification subsystem 160 may determine that the robot 102 has received a new payload of bed linens. Payload verification subsystem 160 may communicate the detected payload information to task tracking subsystem 170 for further processing.

Task tracking subsystem 170 when executed by a processor monitors the initiation and execution of tasks by robot 102. For instance, when the task type is delivery, task tracking subsystem 170 interfaces with payload verification subsystem 160 to monitor the status of payload carried by robot 102 as robot 102 traverses the route received by robot 102 from route planning subsystem 130. When the task type is ushering or mingling, task tracking subsystem 170 may interface with sensor(s) 112 to monitor and track the robot's position relative to human persons and/or physical objects in the surrounding environment.

More generally, task tracking subsystem 170 interfaces with robot control subsystem 190 to cause robot 102 to move through the configurations and postures defined in models 150 in order to drive robot 102 from its position at the start of a task to its position at task completion. If an event occurs during execution of the task, task tracking subsystem 170 may interface with event detection subsystem 180 and robot control subsystem 190 to cause robot 102 to make appropriate adjustments to its movement and/or its route in order to respond to the detected event.

The example event detection subsystem 180 is programmed or configured to receive information from sensor(s) 112 and/or other subsystems of robot 102, such as route planning system 130, payload verification subsystem 160, task tracking subsystem 170, and robot control subsystem 190, and/or other components of the computing system 100. Event detection subsystem 180 is programmed to monitor data streams received from these and/or other data sources, extract information from the data streams, and analyze the extracted information for indications of event occurrences. Examples of event occurrences include detection of a new task or payload, detection of an adjustment to a task or payload.

Mapping

This section of the disclosure describes examples of mapping techniques that may be utilized to program robot 102. The example robot 102 has an onboard memory. The onboard memory may receive and store data that defines a task. A robotically-generated digital map, which enables the robot to perform autonomous navigation, may be stored in the robot's onboard memory. The digital map may include descriptions and/or labels of one or more physical features of the mapped area, such as doors, elevator doors, signage, fiducials, stairways, and the like.

The digital maps may be created on a computer and loaded into the robot's memory, or robot 102 may execute onboard mapping software to generate digital maps for its various tasks. Robot 102 may generate multiple different routes through the mapped environment, based for example on task attributes or payload attributes. For example, robot 102 may generate different routes for different types of tasks or payload. Robot 102 may define any route to include interim stopping points, where the interim stopping points may be delivery locations for different items of payload.

In operation, during execution of a task, robot 102 executes the navigation software stored in its onboard memory. The navigation software, when executed by a processor, causes the robot 102 to read a digital map of the mapped area and a route through the mapped area that is specified for the particular task.

Figure 5A:
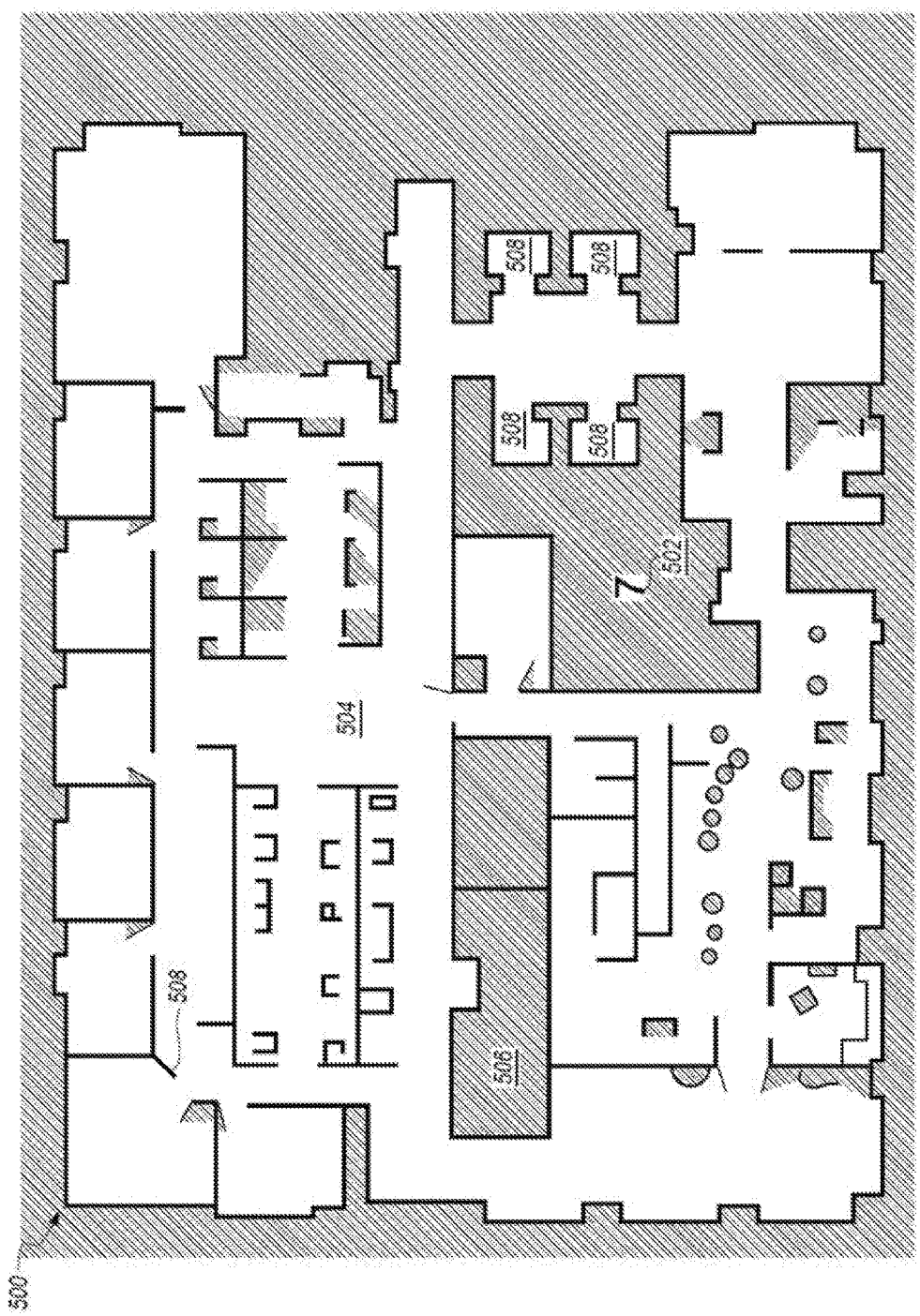
FIG. 5A is a portion of a map usable by a robot, according to at least one embodiment.

FIG. 5A is an example of a robot-generated map 500 of a floor in a building, according to various embodiments. The map 500 includes an annotation 502 of the floor of the building from which the map was generated. White area 504 corresponds to spaces that are navigable by the robot including hallways and rooms. Gray areas 506 include areas that the robot can navigate within but has a higher cost of doing so. These areas may include, for example, bathrooms, small rooms or corners, or cluttered areas. Elevators 508 are annotated on the example map as they may be used by the robot 102 to navigate between floors. Black lines correspond to interior or exterior walls or doors.

The robot-generated map may be updated based on dynamic data, including robot configuration data, real-time data, or other variable data relating to the physical environment, the robot, a task, a route, or a payload. The pixels corresponding to any areas affected by the dynamic data may be modified to indicate an increased or decreased cost of navigation. In an embodiment, the robot-generated map comprises one or more layers. Additional layers reflecting dynamic data may be layered over or under the illustrated map 500. When dynamic data is received by robot 102, a new layer may be generated based on the dynamic data. If the dynamic data is associated with an end time or with a specific time period, the layer may be added to the map or removed from the map at a specified time.

Other examples of robot-generated maps include pixel-level diagrams, which comprise a grid of pixels, with each pixel representing a portion of a mapped area of a physical environment. The pixels can be assigned fixed or variable costs associated with navigation by the robot through the physical area represented by the pixels. The cost to navigate may be linked with the color or intensity of the pixels, for instance white pixels may indicate a zero cost to navigate, meaning that the location corresponds to open space, while dark gray pixels may indicate an infinite cost to navigate, indicating that the location corresponds to a wall or a prohibited area, and medium gray pixels may correspond to areas having an increased, but not infinite, cost to navigate, such as a doorway or an area that may be difficult to navigate.

Figure 5B:
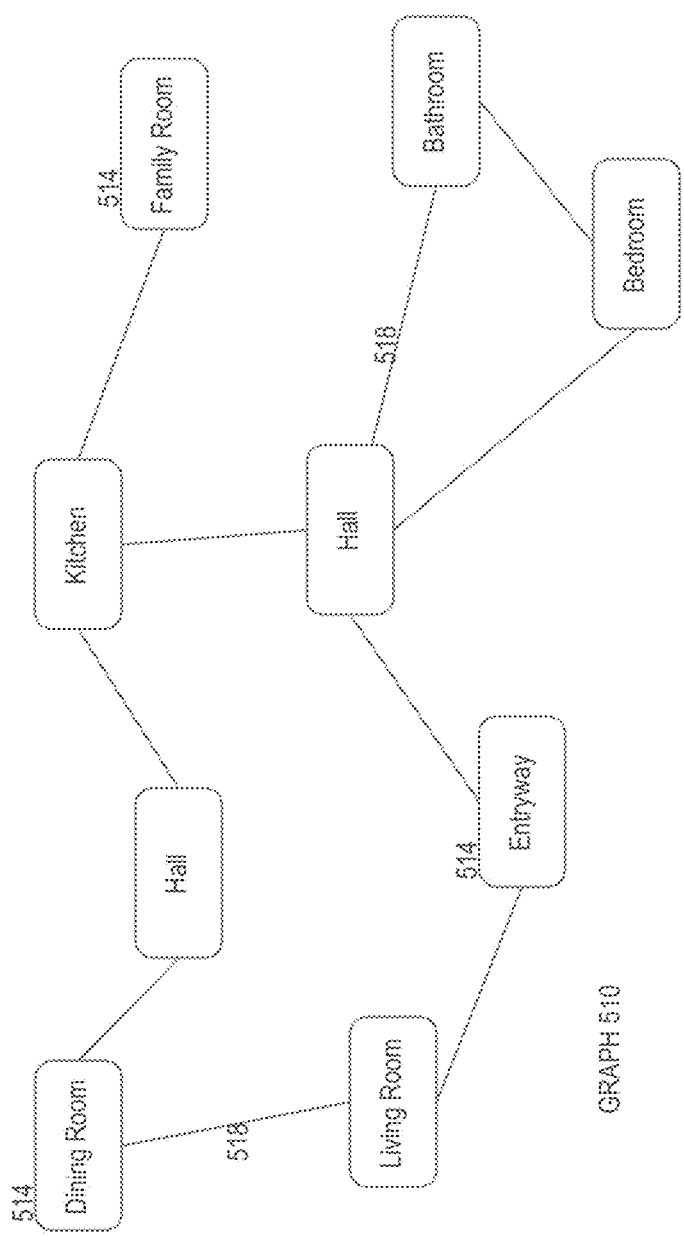
FIG. 5B is a portion of another map usable by a robot, according to at least one embodiment.

FIG. 5B is an example of a graph-based representation of a robot-generated map that may be produced by an autonomous mapping procedure executed by robot 102 or other component(s) of computing system 100. In an embodiment, graph 510 includes a plurality of nodes 514 and a plurality of edges 518. Each node 514 is connected to one or more other nodes by an edge 518. Each edge 518 may be associated with a fixed or variable cost. Any edge 518 or group of edges 518 of the graph may be associated with multiple different task- or robot- or payload-dependent costs.

For example, a delivery task involving transport of linens may associate a relatively low cost with the edge that connects Hall directly to Bathroom but associate a higher cost with the edges that connect Hall to Bedroom and Bedroom to Bathroom. However, if an ushering task involves giving a guest a tour of the house, the ushering task may associate a lower cost with the edge that connects Hall to Bedroom and a higher cost with the edge that connects Hall to Bathroom. In this way, the disclosed technologies can assign task-based cost modifications to a map in order to cause the robot to give preference to a route that is more suitable or favorable for a particular task.

Edges may be included or excluded from any given route based on their associated costs that are relevant to the robot's current task. For instance, if an edge has a cost of navigation that is considered too high, for example if two rooms are connected by an area that the robot is unable to traverse (such as stairs), then the robot-generated map may exclude the edge from the graph or the edge may be excluded from a route based on a cost modification that that is associated with an aspect of the robot's configuration (such as its assigned task or payload or behavior).

A map usable by the robot to navigate an area may include other types of data that describe various aspects of the robot's working environment. For example, the robot-readable map may include data that associates particular features with respective location information (for example, a check-in counter is located in the front room on the first floor or a refrigerator is located behind the counter). Examples of types of maps that may be used in implementations of computing system 100 include object semantic maps and free space maps. The techniques described herein are not limited to any particular type of robot-readable map.

Route Planning and Route Modification Processes

Referring again to FIG. 1, the example robot 102 includes or is communicatively coupled to route planning system 130. Route planning system 130 when executed by a processor generates routes for robot 102 to use in the execution of various tasks that are assigned to the robot. In operation, route planning system 130 utilizes robot configuration data 137 and maps 135.

Robot configuration data 137 includes data, such as identifying data or descriptive data, for example route-related data associated with specific tasks, specific robots or groups of robots, specific robot behaviors, or specific payload items. Task-specific robot configuration data may include a task type identifier that indicates whether the task is, for instance, to deliver a payload or to usher a human person from one location to another or to perform mingling at a location. For instance, robot configuration data may indicate that a relatively higher maximum speed is acceptable when the robot is executing an ushering task rather than a delivery task.

Robot-specific configuration data may include a description of a particular robot's role or capabilities; for example, only a subset of all of the robots in a fleet may be designed to carry payloads or to carry special types of payloads. The robot configuration data may specify that all robots of a certain type should be programmed with a preference to travel a certain route (for instance by assigning higher costs to all other routes).

Specific types of robot behaviors may include sounds, visual effects (such as lighting), speed of travel, or special movements capable of being performed by robots and the robot configuration data may specify locations or routes or tasks for which such behaviors are acceptable or unacceptable. For example, the robot behavior of playing sounds may be associated with a higher cost of travel on routes through areas where guests may be sleeping at certain times of the day.

Robot configuration data relating to specific payload items may include payload-specific handling or routing instructions (for example, the configuration data may associate a higher cost with traveling through the front of the house when the robot's task is to deliver linens).

Maps 135 may be implemented using a searchable, updateable database that stores robot-readable maps generated for example as described above with reference to FIGS. 5A-5B. Maps 135 may include multiple different maps for the same mapped area. For instance, maps 135 may include different maps having different cost data associated with certain routes in the maps, where the differences in cost data are based on differences in robot configuration data 137. The robot configuration-specific costs can be implemented by creating multiple different maps with the different cost data or by selectively adding or removing layers from a map based on the robot configuration data 137.

Cost modification subsystem 132 receives robot configuration data 137 and determines associated cost modifications to the maps 135 based on the robot configuration data 137. Determinations of cost modifications associated with robot configuration data 137 can be performed by cost modification subsystem 132 automatically (for example, by referring a lookup table that maps various robot configurations to associated cost modifications) or with interaction data received by an input device or user interface of the computing system 100, or with a combination of interaction data and automated processing.

Mapping subsystem 134 incorporates any new or changed cost data generated by cost modification subsystem 132 into the maps 135 (for example by creating new maps or adding or removing layers from maps). Creating and updating of maps can be performed by mapping subsystem 134 using a computer program to for example assign cost modifications to maps and routes or using interaction data received by an input device or user interface of the computing system 100, or with a combination of interaction data and automated processing.

Route generation subsystem 136 when executed by a processor accesses maps 135 and robot configuration data 137 and determines route(s) for robot 102 to use when executing a particular task that the robot is programmed to perform according to the robot configuration data 137. The determined routes are stored in or otherwise made accessible to robot 102 for execution of the task. To determine a route, route generation subsystem 136 may execute, for example, a type of graph search algorithm.

Figure 2:
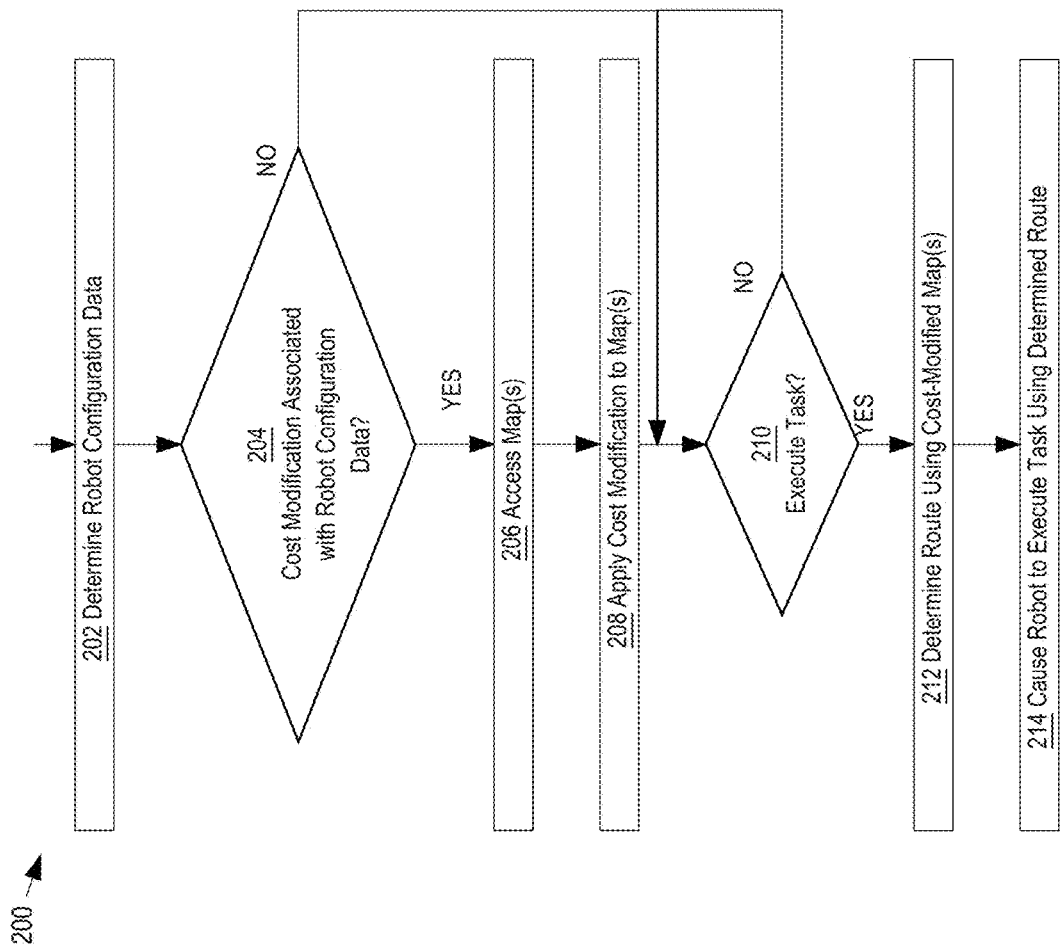
FIG. 2 is a flow diagram of an example process for configuring a route for a mobile robot to execute a task, according to at least one embodiment.

FIG. 2 is a flow diagram of an example process for configuring a route for a mobile robot to travel when executing a task, according to at least one embodiment. Aspects of the process are implemented as processor-executable instructions embodied in computer software, hardware, or a combination of hardware and software. In an embodiment, all or portions of a process 200 of FIG. 2 are performed by one or more components of computing system 100 or by robot 102 under program control, alone or in combination with one or more other computers of computing system 100.

FIG. 2 is intended to disclose an algorithm, plan or outline that can be used to implement one or more computer programs or other software elements which when executed cause performing the functional improvements and technical advances that are described herein. FIG. 2 is described at a level of detail that persons of ordinary skill in the art ordinarily use to communicate with one another about algorithms, plans, or specifications forming a basis of software programs that they plan to code or implement using their accumulated skill and knowledge.

In an operation 202, computing system 100 determines robot configuration data. As discussed herein, robot configuration data may include one or more data elements or attributes that identifies or describes a specific task, payload, and/or robot behavior. For example, robot configuration data may specify that robot number A123 is to execute a delivery task carrying a payload of linens from a pickup location of closet B7 to a destination location of hotel room 525.

The robot configuration data may be received from a facilities computer 108, a remote computer 110, from other robots 102, or from other robots 102, wirelessly or via the robot port computer 104. In one embodiment, one or more of these computers may use push notifications or other affirmative messaging systems to transmit the robot configuration data to the robot 102 for analysis and use in digital mapping and route planning. In another embodiment, the robot 102 may periodically transmit one or more polling messages to any of the aforementioned computers to request then-current task-specific robot configuration data and/or map data.

In some embodiments, robot configuration data can include real-time sensor data associated with physical locations or features within a mapped area. The sensor data may include data indicating an obstacle or event that may affect the robot's ability to successfully complete a task.

In operation 204, computing system 100 determines whether a cost modification is associated with the robot configuration data. To do this, computing system 100 may use, for example, natural language processing algorithms to parse the robot configuration data and extract the cost modification data from the robot configuration data, or computing system 100 may execute a query or table lookup operation to determine a cost modification associated with parameter(s) that it extracts from the robot configuration data, or computing system 100 may obtain the cost modification data by a user interface or input device.

Examples of cost modifications that can be associated with robot configuration data include increases or decreases in the cost of navigation by the robot on particular routes or paths, adjustments to robot operating parameters such as travel speed, and/or adjustments to robot scheduling parameters such as the time of day at which to execute the task.

If in operation 204 computing system 100 determines that no cost modification is associated with the robot configuration data determined in operation 202, computing system 100 proceeds to operation 214, described below. If in operation 204 computing system 100 determines that there is at least one cost modification associated with the robot configuration data determined in operation 202, computing system 100 proceeds to operation 206 to access the robot-readable map(s) affected by the cost modification determined in operation 204. Computing system 100 can determine which, if any, maps are affected by any cost modifications determined in operation 204 by comparing routes associated with the cost modification data to the routes defined in the existing maps.

In operation 208, computing system 100 applies the cost modification(s) determined in operation 204 to the affected map(s) as determined in operation 206. To do this, computing system 100 adds (or subtracts) the cost modification(s) to (or from) existing costs already assigned to the affected routes on the maps or simply assigns the cost modification(s) to the affected routes (such as by annotating the map). In some embodiments, computing system 100 may create one or more new layers of a map, where the new layer(s) include the configuration-specific cost modifications and associations with the affected routes or other features of the map.

Operation 208 may include updating a cost table or cost map that is maintained separately from digital geographical map data. Cost values can be maintained either directly in the geographical map data or in a separate cost table or cost map. The specific data structures that are used in various embodiments are not critical, and others may be used, provided that the robot 102 stores data relating to configuration-based cost modifications associated with routes or other features of an operating environment, with some form of link or association to location data indicating a physical or geographical location or position of the affected routes or other features.

Some feature items have a stationary cost. For example, feature items corresponding to walls may have a permanent, fixed cost. Cost modifications typically would not be applied to features that have a fixed cost. Other routes or other feature items have a variable cost that can be adjusted or modified according to the robot configuration data that is received or determined in operation 202.

The processes for assigning cost modifications to maps described by operations 202, 204, 206, 208 can be performed by computing system 100 in an online or an offline mode, in order to create a set of retrievable maps that can be selectively loaded into robot 102 in response to changes in the robot's configuration data. Operations 210, 212, 214, described below, can be performed online, for example during live operation of robot 102, or offline.

In operation 210, computing system 100 or robot 102 determines whether it has received a task (from another computer, a human or computer operator, or another robot). The task may be received via a WI-FI (wireless fidelity) network or another form of electronic communications network. The task may include additional robot configuration data. If no task is received, the process 200 ends or waits in operation 210 for a new task.

If a task is received in operation 210, in operation 212, computing system 100 or robot 102 determines a route to travel in performing the task, using the cost-modified maps that are generated or updated in operation 208. The route can be determined by computing system 100 or robot 102 executing a graph search algorithm on the maps including the applied cost modifications. Examples of graph search algorithms that can be used with a grid or node-network map include, but are not limited to, Dijkstra, A-Star (A*), D-Star, and D-Star Lite.

In an operation 214, computing system 100 or robot 102 causes the robot to execute the task received or determined in operation 210 using the route determined in operation 212 based on the cost-modified map(s) created or updated in operation 208. To execute the task, the robot's control system causes the robot to travel along or traverse the selected route to complete the task.

After operation 214, the process 200 can return to operation 202 or operation 210. In some embodiments, the robot 102 may continue to perform operations 202, 204, 206, 208 while performing operations 210, 212, 214. The process 200 can be repeated for multiple individual robots in a fleet, using different robot configuration data for different robots, and thereby applying different cost modifications to the maps for different robots to create a set of new maps with different cost modifications applicable to different robots in the fleet.

Also, in operation 210, additional cost modification(s) can be determined in real time based on current conditions evidenced by sensor data, and added to a map that has already been modified with the cost data associated with the robot configuration data. Thus, additional cost adjustments can be applied to the configuration-based cost-modified map(s) so as to enable the process 200 to determine one or more alternative cost-modified routes in response to a current condition, in operation 212.

Figure 3:
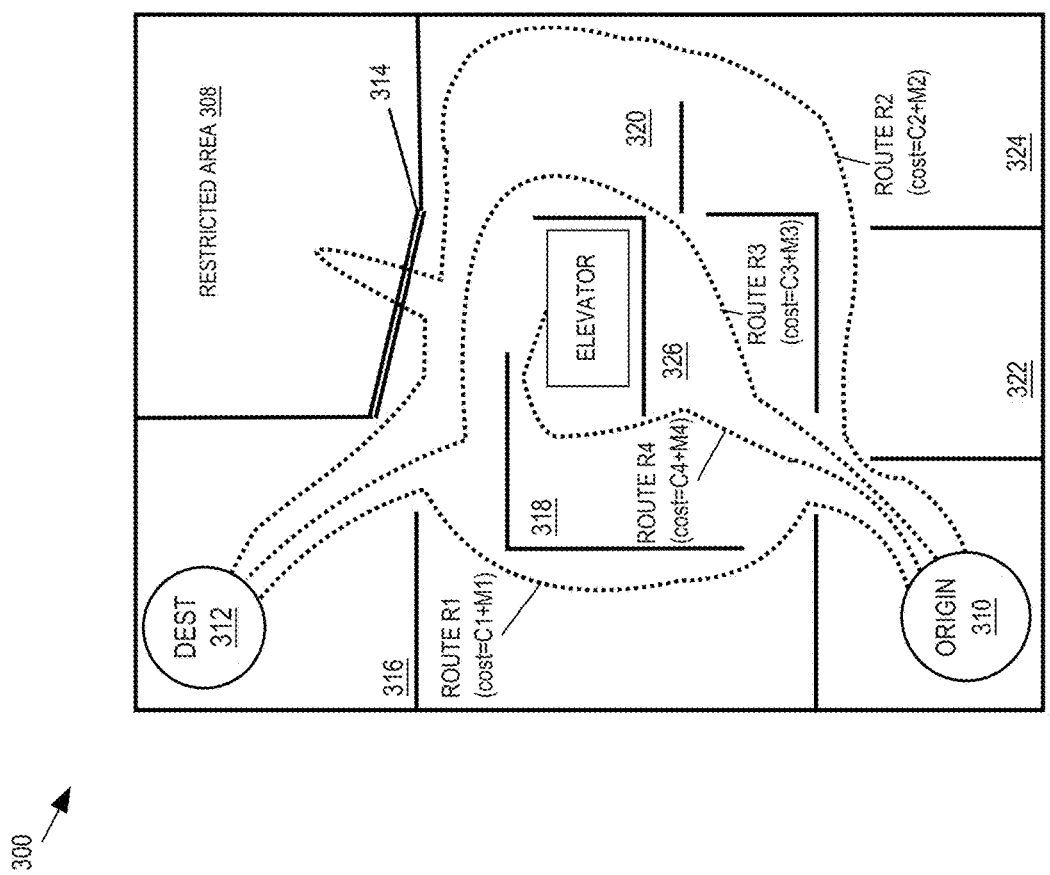
FIG. 3 is a schematic of an example of a robot-generated map of a defined area and examples of routes that may be traversed by a robot, according to at least one embodiment.

FIG. 3 is a schematic of an example of a robot-generated map of a defined physical area (such as a floor of a building or home) and examples of different routes that may be traversed by a robot, according to at least one embodiment. In the example of FIG. 3, a map 300 includes white areas, which correspond to spaces that are navigable by robot 102, such as hallways or larger rooms. Black lines correspond to interior or exterior walls.

The map 300 can indicate geographic or spatial areas that are normally navigable but which robot 102 cannot navigate while performing a particular task. The map 300 may indicate geographic or spatial areas that the robot can navigate but that are associated with a higher cost of navigation for a specific task or other aspect of a specific robot configuration. Non-navigable or higher-cost navigable areas may be determined based on specific aspects of the robot's current configuration, such as a constraint of a particular type of task or constraints that are associated with individual items of the robot's payload. The non-navigable or higher-cost navigable areas may be graphically or textually identified in the robot's digital map, which robot 102 accesses to execute a transport task.

The term cost, as used herein, may refer to a parameter, such as a fixed or computed numerical value, that is used by the robot's route planning and navigation algorithms to determine an appropriate route for the robot to travel through a mapped area. The cost parameter can be computed based on one or more constraints that are specified, for example, in robot configuration data. The cost data is logically associated with an area of the map (such as a route or feature) and further may be associated with specific tasks, robot behaviors, and/or payload items.

Logical associations of cost data, map areas, tasks, and payload items can be stored in the robot's memory. For example, robot 102 may access the stored cost data to determine a cost modification that is associated with a particular type of task or payload. Examples of map areas that may be defined as high cost for particular tasks and/or payload items include front-of-the-house, back-of-the-house, highly visible areas, restricted areas, high traffic areas, low-traffic areas, guest elevators, cargo elevators.

The example map 300 shows a plurality of rooms or areas 308, 316, 318, 320, 322, 324, restricted access door 314. In an example task programmatically defined for a payload, robot 102 may traverse a particular route R1, R2, R3 or R4, which is designed to transport the specific payload from an origin location 310 to a destination location 312. In the example, the routes R1, R2, R3, R4 are computationally generated, by the robot and/or another computer analyzing the cost parameters and cost modifications associated with different sets of robot configuration data, using route planning software. In general, the cost of each route is indicated as the sum of the pre-defined cost $C_i$ (where i=1 to the number of configurations, in this case 4)+the configuration-specific cost modification $M_i$.

In the example of FIG. 3, route R1 may illustrate a route through a front portion of a building, route R2 may illustrate a route through the back of the house that includes entry into a restricted area 308, route R3 may represent a route that traverses high-interest or otherwise high-priority areas of the building, and route R4 may represent a route that leads to a public elevator. Whereas the pre-defined costs $C_i$ may be determined independently of robot configuration data, the cost modifications $M_i$ may vary depending on the robot configuration data. For example, cost C1 of route R1 may always be low because route R1 is the shortest distance between origin 310 and destination 312. However, M1 may be set high for certain robot configurations, for example, thereby causing the total cost of route R1 to be high for those robot configurations. In this way, computing system 100 can establish a preference for some robots performing certain tasks to avoid route R1 and instead use another preferred route.

Similarly, the cost C2 of route R2 may always be very high because it is the longest distance between origin 310 and destination 312 and because it includes an entry into a restricted area. However, for certain tasks, the cost modification M2 may be set at a high negative number to offset the very high C2 and lower the total cost. Thus, computing system 100 can establish R2 as a preferred route for certain robots or tasks. The same is true for routes R3 and R4 in that the associated costs of navigation can be adjusted based on various aspects of robot configuration data. In this way, certain routes can be prioritized over others based on the nature of the robot's task or other configuration data.

Figure 4:
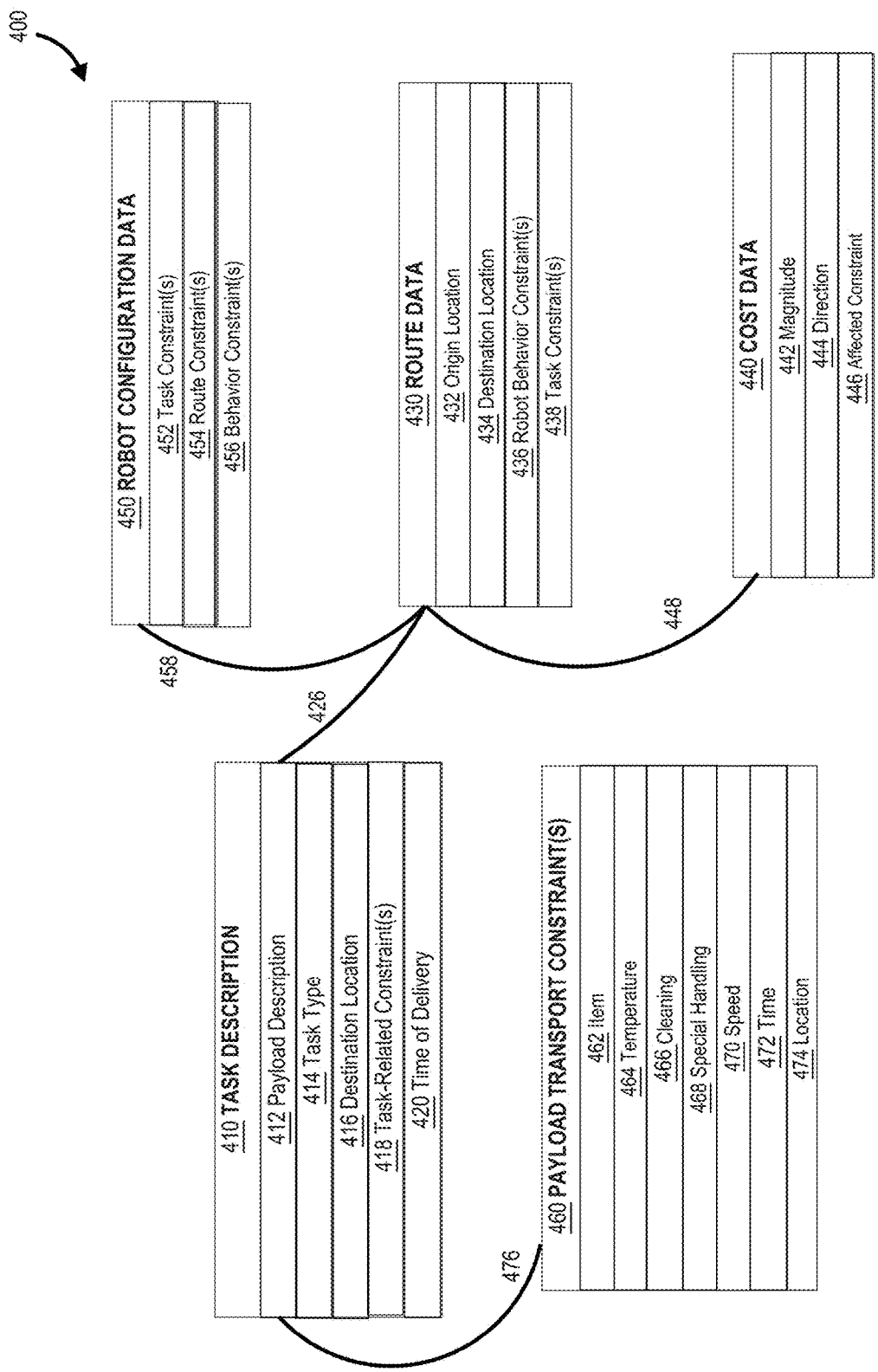
FIG. 4 is an example of a data model diagram that illustrates data elements and relationships between data elements, according to at least one embodiment.

FIG. 4 is an example of a data model diagram that illustrates data elements and relationships between data elements, according to at least one embodiment.

To implement the robot configuration-specific features and capabilities of route planning system 130 and robot 102, rules and parameters may be defined and organized according to a logical model. The model is computer generated and stored in computer memory. The model may be used by computer software to generate data structures, such as ontologies or database tables and relationships between database tables, and computer code. An example of a model is shown in FIG. 4.

The model 400 includes the following data entities: task description 410, route data 430, cost data 440, robot configuration data 450, and payload transport constraints 460. Task description 410 is configured to store data parameters and rules relating to robotic tasks. Route data 430 maintains data and references to route specifications that determine robot 102's path of travel during execution of a task and constraints associated with the route. In general, a data entity is instantiated when its attributes are populated with sets of data, where each set of data represents one instance (or data record).

Cost data 440 stores data and rules defining the robot configuration-specific cost specifications and associated constraints, with magnitude indicating a numerical value and direction indicating whether the value is positive or negative.

Robot configuration data 450 stores data and rules defining constraints associated with a particular robot configuration.

Payload transport constraints 460 stores data and rules defining the item-specific transport requirements that are associated with specific items of robot payload. The payload transport constraints 460 may include rules that are based on special characteristics of certain items that can affect route determination.

The model 400 includes links 426, 448, 458, 476. The links 426, 448, 458, 476 represent logical relationships between the data entities 410, 430, 440, 450, 460. For instance, an instance of route data 430 can be linked with a number of instances of task descriptions 410, configuration data 450, and cost data 440, and an instance of task description 410 can be linked with one or more instances of payload transport constraints 460.

Each data entity in the model 400 has a number of attributes. The example task description 410 includes the following attributes: payload description 412, task type 414, destination location 416, task-related constraints 418, time of delivery 420. The example route data 430 includes the following attributes: origin location 432, destination location 434, robot behavior constraint(s) 436 and task constraint(s) 438. The example cost data 440 includes the following attributes: magnitude 442, direction 444, affected constraint 446. The example robot configuration data 450 includes the following attributes: task constraints 452, route constraints 454, behavior constraints 456. The example payload transport constraints 460 includes the following attributes: item 462, temperature 464, cleaning 466, special handling 468, speed 470, time 472, location 474. The attributes of each entity can be populated with, for example, data parameters, rules or logic, or references to other data entities. For example, constraints 452, 454, 456 may be populated with configuration-specific rules or threshold values that only apply when the specific robot configuration is loaded into the robot.

IMPLEMENTATION EXAMPLE—HARDWARE OVERVIEW

According to one embodiment, the techniques described herein are implemented by at least one computing device. For example, portions of the disclosed technologies may be at least temporarily implemented on a network including a combination of at least one server computer and/or other computing devices. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, personal computers, or a network of server computers and/or personal computers. Illustrative examples of computers are desktop computer systems, portable computer systems, handheld devices, mobile computing devices, wearable devices, body mounted or implantable devices, smart phones, smart appliances, networking devices, autonomous or semi-autonomous devices such as robots or unmanned ground or aerial vehicles, or any other electronic device that incorporates hard-wired and/or program logic to implement the described techniques.

Figure 6:
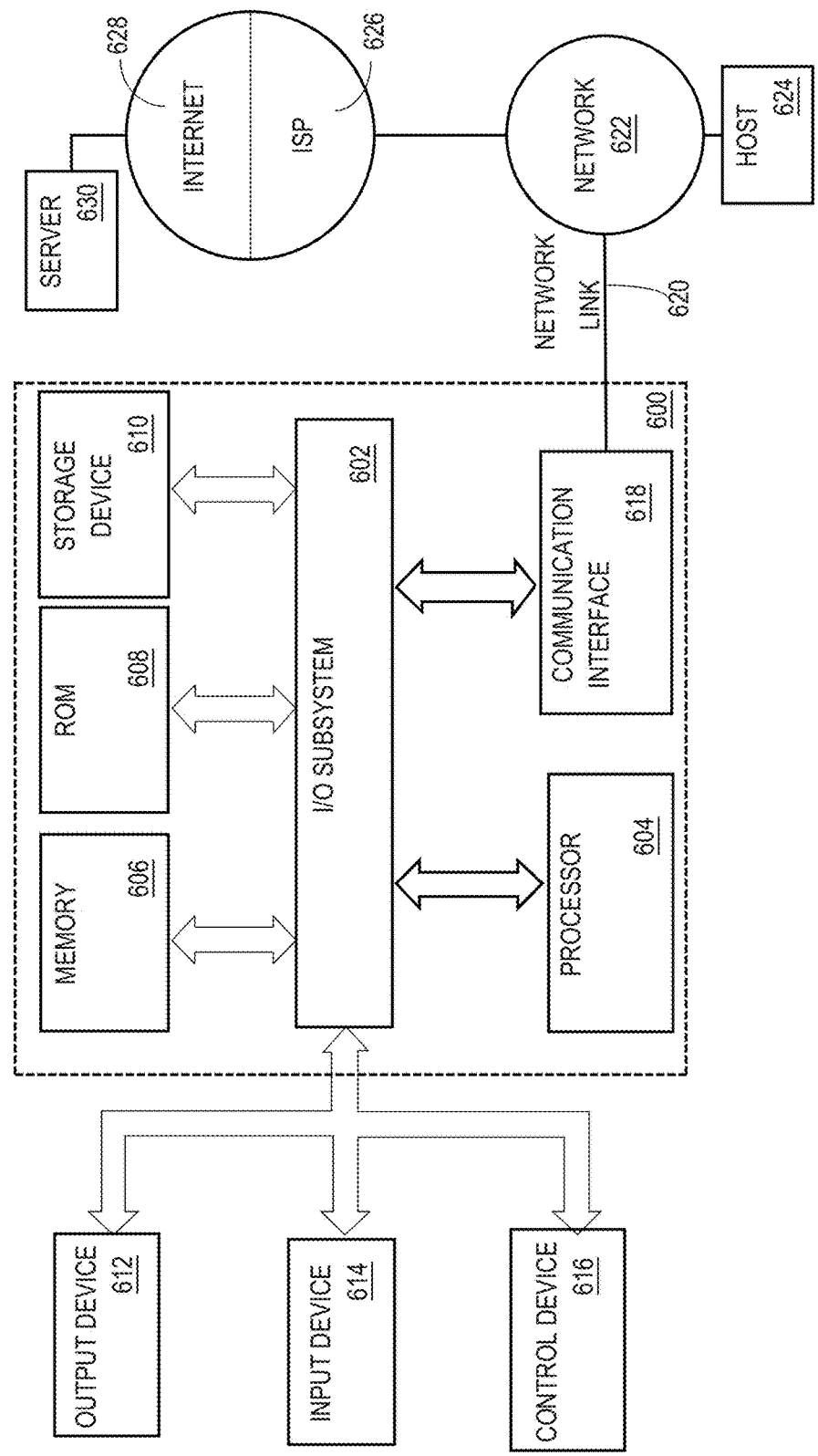
FIG. 6 is a simplified block diagram that illustrates a computer system in connection with which portions of at least one embodiment may be implemented.

For example, FIG. 6 is a block diagram that illustrates a computer system 600 upon which an embodiment of the present invention may be implemented. Components of the computer system 600, including instructions for implementing the disclosed technologies in hardware, software, or a combination of hardware and software, are represented schematically in the drawings, for example as boxes and circles.

Computer system 600 includes an input/output (I/O) subsystem 602 which may include a bus and/or other communication mechanism(s) for communicating information and/or instructions between the components of the computer system 600 over electronic signal paths. The I/O subsystem may include an I/O controller, a memory controller and at least one I/O port. The electronic signal paths are represented schematically in the drawings, for example as lines, unidirectional arrows, or bidirectional arrows.

At least one hardware processor 604 is coupled with I/O subsystem 602 for processing information and instructions. Hardware processor 604 may include, for example, a general-purpose microprocessor or microcontroller and/or a special-purpose microprocessor such as an embedded system or a graphics processing unit (GPU) or a digital signal processor.

Computer system 600 also includes a memory 606 such as a main memory, which is coupled to I/O subsystem 602 for storing information and instructions to be executed by processor 604. Memory 606 may include volatile memory such as various forms of random-access memory (RAM) or other dynamic storage device. Memory 606 also may be used for storing temporary variables or other intermediate information during execution of instructions to be executed by processor 604. Such instructions, when stored in non-transitory computer-readable storage media accessible to processor 604, render computer system 600 into a special-purpose machine that is customized to perform the operations specified in the instructions.

Computer system 600 further includes a non-volatile memory such as read only memory (ROM) 608 or other static storage device coupled to I/O subsystem 602 for storing static information and instructions for processor 604. The ROM 608 may include various forms of programmable ROM (PROM) such as erasable PROM (EPROM) or electrically erasable PROM (EEPROM). A persistent storage device 610 may include various forms of non-volatile RAM (NVRAM), such as flash memory, or solid-state storage, magnetic disk or optical disk, and may be coupled to I/O subsystem 602 for storing information and instructions.

Computer system 600 may be coupled via I/O subsystem 602 to at least one output device 612 such as a display device. Display 612 may be embodied as, for example, a touch screen display or a light-emitting diode (LED) display or a liquid crystal display (LCD) for displaying information, such as to a computer user. Computer system 600 may include other type(s) of output devices, such as speakers, LED indicators and haptic devices, alternatively or in addition to a display device.

At least one input device 614 is coupled to I/O subsystem 602 for communicating signals, information and command selections to processor 604. Types of input devices 614 include touch screens, microphones, still and video digital cameras, alphanumeric and other keys, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 616, which may perform cursor control or other automated control functions such as navigation in a graphical interface on a display screen, alternatively or in addition to input functions. Control device 616 may be implemented as a touchpad, a mouse, a trackball, or cursor direction keys for communicating direction information and command selections to processor 604 and for controlling cursor movement on display 612. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 614 may include a combination of multiple different input devices, such as a video camera and a depth sensor.

Computer system 600 may implement the techniques described herein using customized hard-wired logic, at least one ASIC or FPGA, firmware and/or program logic which in combination with the computer system causes or programs computer system 600 to operate as a special-purpose machine. According to one embodiment, the techniques herein are performed by computer system 600 in response to processor 604 executing at least one sequence of at least one instruction contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as memory 606. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 602. Transmission media can also take the form of acoustic or light waves, such as those generated during radio-wave and infra-red data communications.

Various forms of media may be involved in carrying at least one sequence of at least one instruction to processor 604 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 600 can receive the data on the communication link and convert the data to a format that can be read by computer system 600. For instance, a receiver such as a radio frequency antenna or an infrared detector can receive the data carried in a wireless or optical signal and appropriate circuitry can provide the data to I/O subsystem 602 such as place the data on a bus. I/O subsystem 602 carries the data to memory 606, from which processor 604 retrieves and executes the instructions. The instructions received by memory 606 may optionally be stored on storage device 610 either before or after execution by processor 604.

Computer system 600 also includes a communication interface 618 coupled to bus 602. Communication interface 618 provides a two-way data communication coupling to network link(s) 620 that are directly or indirectly connected to at least one communication networks, such as a local network 622 or a public or private cloud on the Internet. For example, communication interface 618 may be an integrated-services digital network (ISDN) card, cable modem, satellite modem, or a modem to provide a data communication connection to a corresponding type of communications line, for example a coaxial cable or a fiber-optic line or a telephone line. As another example, communication interface 618 may include a local area network (LAN) card to provide a data communication connection to a compatible LAN. Wireless links may also be implemented. In any such implementation, communication interface 618 sends and receives electrical, electromagnetic or optical signals over signal paths that carry digital data streams representing various types of information.

Network link 620 typically provides electrical, electromagnetic, or optical data communication directly or through at least one network to other data devices, using, for example, cellular, Wi-Fi, or BLUETOOTH technology. For example, network link 620 may provide a connection through a local network 622 to a host computer 624 or to other computing devices, such as personal computing devices or Internet of Things (IoT) devices and/or data equipment operated by an Internet Service Provider (ISP) 626. ISP 626 provides data communication services through the world-wide packet data communication network commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data and instructions, including program code, through the network(s), network link 620 and communication interface 618. In the Internet example, a server 530 might transmit a requested code for an application program through Internet 628, ISP 626, local network 622 and communication interface 618. The received code may be executed by processor 604 as it is received, and/or stored in storage device 610, or other non-volatile storage for later execution.

Additional Examples

Illustrative examples of the technologies disclosed herein are provided below. An embodiment of the technologies may include any at least one, and any combination of, the examples described below.

In an example 1, a computer-implemented method for controlling movement of an autonomous mobile robot includes accessing a map, the map comprising, for a plurality of locations in a mapped area, location data, route data, and cost data, an instance of the route data indicative of a robot-navigable path from a location to another location, an instance of the cost data associated with the robot-navigable path; receiving robot configuration data relating to a task that is executable by the robot, the robot configuration data comprising task description data and destination data; based on the task description data, determining a cost modification associated with the path; using a task-specific map comprising the map and the cost modification, determining a route usable by the robot to traverse to a destination location identified in the destination data and to perform a task identified in the task description data; causing the robot to execute instructions to perform the task using the determined route.

An example 2 includes the subject matter of example 1, and includes, when the robot configuration data comprises a payload description, determining the cost modification based on the payload description.

An example 3 includes the subject matter of example 1 or example 2, and includes, when the task description data comprises a task type, determining the task type as one of a delivery task or a mingle task or an usher task; determining the cost modification based on the task type.

An example 4 includes the subject matter of any of examples 1-3, and includes, when the robot configuration data comprises robot behavior specifications, determining the cost modification based on the robot behavior specifications.

An example 5 includes the subject matter of any of examples 1-4, wherein determining a cost modification associated with the path comprises increasing a cost associated with the path based on the robot configuration data.

An example 6 includes the subject matter of any of examples 1-5, wherein determining a cost modification associated with the path comprises decreasing a cost associated with the path based on the robot configuration data.

An example 7 includes the subject matter of any of examples 1-6, wherein determining a cost modification associated with the path comprises changing a speed parameter associated with traversal of the path by the robot based on the robot configuration data.

An example 8 includes the subject matter of any of examples 1-7, wherein determining a cost modification associated with the path comprises changing a time of day parameter associated with traversal of the path by the robot based on the robot configuration data.

An example 9 includes the subject matter of any of examples 1-8, and includes determining a current condition relating to the task; adjusting the cost modification based on the current condition; adding the adjusted cost modification to the task-specific map; using the task-specific map comprising the adjusted cost modification, determining an alternative route usable by the robot to traverse to the destination location identified in the destination data and to perform the task identified in the task description data; causing the robot to execute instructions to perform the task using the alternative route.

An example 10 includes the subject matter of any of examples 1-9, and includes generating a set of new maps usable by a plurality of robots, the set of new maps including a plurality of cost modifications applicable to different robots in the plurality of robots.

In an example 11, a system for controlling movement of an autonomous mobile robot includes one or more processors; a communication interface coupled to the one or more processors; one or more non-transitory computer-readable storage media coupled to the one or more processors and storing sequences of instructions, which when executed by the one or more processors, cause the one or more processors to perform operations comprising: accessing a map, the map comprising, for a plurality of locations in a mapped area, location data, route data, and cost data, an instance of the route data indicative of a robot-navigable path from a location to another location, an instance of the cost data associated with the robot-navigable path; receiving robot configuration data relating to a task that is executable by the robot, the robot configuration data comprising task description data and destination data; based on the task description data, determining a cost modification associated with the path; using a task-specific map comprising the map and the cost modification, determining a route usable by the robot to traverse to a destination location identified in the destination data and to perform a task identified in the task description data; causing the robot to execute instructions to perform the task using the determined route.

An example 12 includes the subject matter of example 11, wherein the instructions, when executed by the one or more processors, cause the one or more processors to perform operations comprising, when the robot configuration data comprises a payload description, determining the cost modification based on the payload description.

An example 13 includes the subject matter of example 11 or example 12, wherein the instructions, when executed by the one or more processors, cause the one or more processors to perform operations comprising: when the task description data comprises a task type, determining the task type as one of a delivery task or a mingle task or an usher task; determining the cost modification based on the task type.

An example 14 includes the subject matter of any of examples 11-13, wherein the instructions, when executed by the one or more processors, cause the one or more processors to perform operations comprising, when the robot configuration data comprises robot behavior specifications, determining the cost modification based on the robot behavior specifications.

An example 15 includes the subject matter of any of examples 11-14, wherein determining a cost modification associated with the path comprises increasing a cost associated with the path based on the robot configuration data.

An example 16 includes the subject matter of any of examples 11-15, wherein determining a cost modification associated with the path comprises decreasing a cost associated with the path based on the robot configuration data.

An example 17 includes the subject matter of any of examples 11-16, wherein determining a cost modification associated with the path comprises changing a speed parameter associated with traversal of the path by the robot based on the robot configuration data.

An example 18 includes the subject matter of any of examples 11-17, wherein determining a cost modification associated with the path comprises changing a time of day parameter associated with traversal of the path by the robot based on the robot configuration data.

An example 19 includes the subject matter of any of examples 11-18, wherein the instructions, when executed by the one or more processors, cause the one or more processors to perform operations comprising: determining a current condition relating to the task; adjusting the cost modification based on the current condition; adding the adjusted cost modification to the task-specific map; using the task-specific map comprising the adjusted cost modification, determining an alternative route usable by the robot to traverse to the destination location identified in the destination data and to perform the task identified in the task description data; causing the robot to execute instructions to perform the task using the alternative route.

An example 20 includes the subject matter of any of examples 11-19, wherein the instructions, when executed by the one or more processors, cause the one or more processors to perform operations comprising generating a set of new maps usable by a plurality of robots, the set of new maps including a plurality of cost modifications applicable to different robots in the plurality of robots.

In an example 21, a computer program product for controlling movement of an autonomous mobile robot, the computer program product comprising one or more non-transitory computer readable storage media storing instructions which, when executed by one or more processors, cause one or more processors to perform operations comprising: accessing a map, the map comprising, for a plurality of locations in a mapped area, location data, route data, and cost data, an instance of the route data indicative of a robot-navigable path from a location to another location, an instance of the cost data associated with the robot-navigable path; receiving robot configuration data relating to a task that is executable by the robot, the robot configuration data comprising task description data and destination data; based on the task description data, determining a cost modification associated with the path; using a task-specific map comprising the map and the cost modification, determining a route usable by the robot to traverse to a destination location identified in the destination data and to perform a task identified in the task description data; causing the robot to execute instructions to perform the task using the determined route.

An example 22 includes the subject matter of example 21, wherein the instructions, when executed by the one or more processors, cause the one or more processors to perform operations comprising, when the robot configuration data comprises a payload description, determining the cost modification based on the payload description.

An example 23 includes the subject matter of example 21 or example 22, wherein the instructions, when executed by the one or more processors, cause the one or more processors to perform operations comprising: when the task description data comprises a task type, determining the task type as one of a delivery task or a mingle task or an usher task; determining the cost modification based on the task type.

An example 24 includes the subject matter of any of examples 21-23, wherein the instructions, when executed by the one or more processors, cause the one or more processors to perform operations comprising, when the robot configuration data comprises robot behavior specifications, determining the cost modification based on the robot behavior specifications.

An example 25 includes the subject matter of any of examples 21-24, wherein determining a cost modification associated with the path comprises increasing a cost associated with the path based on the robot configuration data.

An example 26 includes the subject matter of any of examples 21-25, wherein determining a cost modification associated with the path comprises decreasing a cost associated with the path based on the robot configuration data.

An example 27 includes the subject matter of any of examples 21-26, wherein determining a cost modification associated with the path comprises changing a speed parameter associated with traversal of the path by the robot based on the robot configuration data.

An example 28 includes the subject matter of any of examples 21-27, wherein determining a cost modification associated with the path comprises changing a time of day parameter associated with traversal of the path by the robot based on the robot configuration data.

An example 29 includes the subject matter of any of examples 21-28, comprising: determining a current condition relating to the task; adjusting the cost modification based on the current condition; adding the adjusted cost modification to the task-specific map; using the task-specific map comprising the adjusted cost modification, determining an alternative route usable by the robot to traverse to the destination location identified in the destination data and to perform the task identified in the task description data; causing the robot to execute instructions to perform the task using the alternative route.

An example 30 includes the subject matter of any of examples 21-29, comprising generating a set of new maps usable by a plurality of robots, the set of new maps including a plurality of cost modifications applicable to different robots in the plurality of robots.

General Considerations

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Any definitions set forth herein for terms contained in the claims may govern the meaning of such terms as used in the claims. No limitation, element, property, feature, advantage or attribute that is not expressly recited in a claim should limit the scope of the claim in any way. The specification and drawings are to be regarded in an illustrative rather than a restrictive sense.

As used herein the terms "include" and "comprise" (and variations of those terms, such as "including," "includes," "comprising," "comprises," "comprised" and the like) are intended to be inclusive and are not intended to exclude further features, components, integers or steps.

References in this document to "an embodiment," etc., indicate that the embodiment described or illustrated may include a particular feature, structure, or characteristic, but every embodiment may not necessarily include the particular feature, structure, or characteristic. Such phrases are not necessarily referring to the same embodiment. Further, when a particular feature, structure, or characteristic is described or illustrated in connection with an embodiment, it is believed to be within the knowledge of one skilled in the art to effect such feature, structure, or characteristic in connection with other embodiments whether or not explicitly indicated.

Various features of the disclosure have been described using process steps. The functionality/processing of a given process step could potentially be performed in different ways and by different systems or system modules. Furthermore, a given process step could be divided into multiple steps and/or multiple steps could be combined into a single step. Furthermore, the order of the steps can be changed without departing from the scope of the present disclosure.

It will be understood that the embodiments disclosed and defined in this specification extend to alternative combinations of the individual features and components mentioned or evident from the text or drawings. These different combinations constitute various alternative aspects of the embodiments.

What is claimed is:

1. A computer-implemented method for controlling movement of an autonomous mobile robot, the method comprising:
    accessing a map, the map comprising, for a plurality of locations in a mapped area, location data, route data, and cost data, an instance of the route data indicative of a robot-navigable path from a location to another location, an instance of the cost data associated with the robot-navigable path;
    receiving robot configuration data relating to a task that is executable by the autonomous mobile robot, the robot configuration data comprising task description data and destination data;
    based on the task description data, determining a cost modification associated with the robot-navigable path;
    using a task-specific map comprising the map and the cost modification, determining a route usable by the autonomous mobile robot to traverse to a destination location identified in the destination data and to perform a task identified in the task description data;
    causing the autonomous mobile robot to execute instructions to perform the task using the determined route;
    when the robot configuration data comprises a payload description, determining the cost modification based on the payload description.

2. The method of claim 1, comprising:
    when the task description data comprises a task type, determining the task type as one of a delivery task or a mingle task or an usher task;
    determining the cost modification based on the task type.

3. The method of claim 1, comprising, when the robot configuration data comprises robot behavior specifications, determining the cost modification based on the robot behavior specifications.

4. The method of claim 1,
    wherein determining a cost modification associated with the robot-navigable path comprises increasing a cost associated with the robot-navigable path based on the robot configuration data.

5. The method of claim 1, wherein determining a cost modification associated with the robot-navigable path comprises decreasing a cost associated with the robot-navigable path based on the robot configuration data.

6. The method of claim 1, wherein determining a cost modification associated with the robot-navigable path comprises changing a speed parameter associated with traversal of the robot-navigable path by the autonomous mobile robot based on the robot configuration data.

7. The method of claim 1, wherein determining a cost modification associated with the robot-navigable path comprises changing a time of day parameter associated with traversal of the robot-navigable path by the autonomous mobile robot based on the robot configuration data.

8. The method of claim 1, comprising:
    determining a current condition relating to the task;
    adjusting the cost modification based on the current condition;
    adding the adjusted cost modification to the task-specific map;
    using the task-specific map comprising the adjusted cost modification, determining an alternative route usable by the autonomous mobile robot to traverse to the destination location identified in the destination data and to perform the task identified in the task description data;
    causing the autonomous mobile robot to execute instructions to perform the task using the alternative route.

9. The method of claim 1, comprising generating a set of new maps usable by a plurality of robots, the set of new maps including a plurality of cost modifications applicable to different robots in the plurality of robots.

10. A system for controlling movement of an autonomous mobile robot, the system comprising:
    one or more processors;
    a communication interface coupled to the one or more processors;
    one or more non-transitory computer-readable storage media coupled to the one or more processors and storing sequences of instructions, which when executed by the one or more processors, cause the one or more processors to perform operations comprising:
    accessing a map, the map comprising, for a plurality of locations in a mapped area, location data, route data, and cost data, an instance of the route data indicative of a robot-navigable path from a location to another location, an instance of the cost data associated with the robot-navigable path;
    receiving robot configuration data relating to a task that is executable by the autonomous mobile robot, the robot configuration data comprising task description data and destination data;
    based on the task description data, determining a cost modification associated with the robot-navigable path;
    using a task-specific map comprising the map and the cost modification, determining a route usable by the autonomous mobile robot to traverse to a destination location identified in the destination data and to perform a task identified in the task description data;
    causing the autonomous mobile robot to execute instructions to perform the task using the determined route;
    when the robot configuration data comprises a payload description, determining the cost modification based on the payload description.

11. The system of claim 10, wherein the instructions, when executed by the one or more processors, cause the one or more processors to perform operations comprising:
    when the task description data comprises a task type, determining the task type as one of a delivery task or a mingle task or an usher task;
    determining the cost modification based on the task type.

12. The system of claim 11, wherein the instructions, when executed by the one or more processors, cause the one or more processors to perform operations comprising, when the robot configuration data comprises robot behavior specifications, determining the cost modification based on the robot behavior specifications.

13. The system of claim 10, wherein determining a cost modification associated with the robot-navigable path comprises increasing a cost associated with the robot-navigable path based on the robot configuration data.

14. The system of claim 10, wherein determining a cost modification associated with the robot-navigable path comprises decreasing a cost associated with the robot-navigable path based on the robot configuration data.

15. The system of claim 10, wherein determining a cost modification associated with the robot-navigable path comprises changing a speed parameter associated with traversal of the robot-navigable path by the autonomous mobile robot based on the robot configuration data.

16. The system of claim 10, wherein determining a cost modification associated with the robot-navigable path comprises changing a time of day parameter associated with traversal of the robot-navigable path by the autonomous mobile robot based on the robot configuration data.

17. The system of claim 10, wherein the instructions, when executed by the one or more processors, cause the one or more processors to perform operations comprising:
   determining a current condition relating to the task;
   adjusting the cost modification based on the current condition;
   adding the adjusted cost modification to the task-specific map;
   using the task-specific map comprising the adjusted cost modification, determining an alternative route usable by the autonomous mobile robot to traverse to the destination location identified in the destination data and to perform the task identified in the task description data;
   causing the autonomous mobile robot to execute instructions to perform the task using the alternative route.

18. The system of claim 10, wherein the instructions, when executed by the one or more processors, cause the one or more processors to perform operations comprising generating a set of new maps usable by a plurality of robots, the set of new maps including a plurality of cost modifications applicable to different robots in the plurality of robots.

19. A computer program product for controlling movement of an autonomous mobile robot, the computer program product comprising one or more non-transitory computer readable storage media storing instructions which, when executed by one or more processors, cause one or more processors to perform operations comprising:
   accessing a map, the map comprising, for a plurality of locations in a mapped area, location data, route data, and cost data, an instance of the route data indicative of a robot-navigable path from a location to another location, an instance of the cost data associated with the robot-navigable path;
   receiving robot configuration data relating to a task that is executable by the autonomous mobile robot, the robot configuration data comprising task description data and destination data;
   based on the task description data, determining a cost modification associated with the robot-navigable path;
   using a task-specific map comprising the map and the cost modification, determining a route usable by the autonomous mobile robot to traverse to a destination location identified in the destination data and to perform a task identified in the task description data;
   causing the autonomous mobile robot to execute instructions to perform the task using the determined route;
   when the robot configuration data comprises a payload description, determining the cost modification based on the payload description.

20. The computer program product of claim 19, wherein the instructions, when executed by the one or more processors, cause the one or more processors to perform operations comprising:
   when the task description data comprises a task type, determining the task type as one of a delivery task or a mingle task or an usher task;
   determining the cost modification based on the task type.

21. The computer program product of claim 19, wherein the instructions, when executed by the one or more processors, cause the one or more processors to perform operations comprising, when the robot configuration data comprises robot behavior specifications, determining the cost modification based on the robot behavior specifications.

22. The computer program product of claim 19, wherein determining a cost modification associated with the robot-navigable path comprises increasing a cost associated with the robot-navigable path based on the robot configuration data.

23. The computer program product of claim 19, wherein determining a cost modification associated with the robot-navigable path comprises decreasing a cost associated with the robot-navigable path based on the robot configuration data.

24. The computer program product of claim 19, wherein determining a cost modification associated with the robot-navigable path comprises changing a speed parameter associated with traversal of the robot-navigable path by the autonomous mobile robot based on the robot configuration data.

25. The computer program product of claim 19, wherein determining a cost modification associated with the robot-navigable path comprises changing a time of day parameter associated with traversal of the robot-navigable path by the autonomous mobile robot based on the robot configuration data.

26. The computer program product of claim 19, comprising:
   determining a current condition relating to the task;
   adjusting the cost modification based on the current condition;
   adding the adjusted cost modification to the task-specific map;
   using the task-specific map comprising the adjusted cost modification, determining an alternative route usable by the autonomous mobile robot to traverse to the destination location identified in the destination data and to perform the task identified in the task description data;
   causing the autonomous mobile robot to execute instructions to perform the task using the alternative route.

27. The computer program product of claim 19, comprising generating a set of new maps usable by a plurality of robots, the set of new maps including a plurality of cost modifications applicable to different robots in the plurality of robots.

* * * * *